United States Patent
An et al.

(10) Patent No.: US 7,415,172 B2
(45) Date of Patent: Aug. 19, 2008

(54) DIFFRACTIVE WAVEGUIDE-SPATIAL OPTICAL MODULATOR

(75) Inventors: Seung Do An, Suwon-si (KR); Anatoliy Lapchuk, Suwon-si (KR); Victor Yurlov, Gyeonggi-do (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 11/592,493

(22) Filed: Nov. 2, 2006

(65) Prior Publication Data

US 2007/0098318 A1 May 3, 2007

(30) Foreign Application Priority Data

Nov. 3, 2005 (KR) .................. 10-2005-0104975

(51) Int. Cl.
*G02F 1/295* (2006.01)
(52) U.S. Cl. .................. 385/10; 385/4; 385/8
(58) Field of Classification Search ............ 385/4, 385/8, 10, 37, 901
See application file for complete search history.

(56) References Cited

U.S. PATENT DOCUMENTS

| | | | | |
|---|---|---|---|---|
| 5,708,521 A | * | 1/1998 | Jeon et al. | 359/224 |
| 6,750,998 B2 | * | 6/2004 | Kruschwitz et al. | 359/230 |
| 7,149,028 B2 | * | 12/2006 | Yun | 359/290 |
| 7,161,281 B2 | * | 1/2007 | Takeuchi et al. | 310/334 |
| 7,248,408 B2 | * | 7/2007 | Yun | 359/567 |

FOREIGN PATENT DOCUMENTS

| KR | 10-0459899 | 11/2004 |
|---|---|---|
| KR | 10-2005-0004353 | 1/2005 |

* cited by examiner

*Primary Examiner*—Sarah Song
(74) *Attorney, Agent, or Firm*—Christensen O'Connor Johnson Kindness PLLC

(57) ABSTRACT

Disclosed herein is a diffractive waveguide-spatial optical modulator. The diffractive waveguide-spatial optical modulator includes a substrate member, a plurality of reflecting members, and an actuation means. The reflecting members are each formed in a plate shape, are arranged on the substrate member at regular intervals to form a grating array, are configured to form openings therebetween, and are provided with reflecting surfaces formed on the opposite vertical surfaces of the reflecting members and the bottoms of the openings. The actuation means varies the interval between the reflecting members by actuating the reflecting members. The openings between the reflecting members act as wave guides when light is incident on the open sides thereof, and shift the phase of the incident light and then reflect the incident light, so that the reflected light can form diffracted light, when the interval is varied by the reflecting members.

19 Claims, 7 Drawing Sheets

US 7,415,172 B2

DIFFRACTIVE WAVEGUIDE-SPATIAL OPTICAL MODULATOR

CROSS-REFERENCE TO RELATED APPLICATION

This application claims the benefit of Korean Patent Application No. 10-2005-0104975, filed Nov. 3, 2005, entitled "Wave-guide spatial optical modulator diffraction type", which is hereby incorporated by reference in its entirety into this application.

BACKGROUND

1. Field of the Invention

The present invention relates generally to an optical modulator and, more particularly, to a diffractive waveguide-spatial optical modulator that shifts the phase of incident light by varying the interval between the opposite vertical surfaces of a plurality of reflecting members forming a grating array, thereby forming diffracted light.

2. Description of the Related Art

In the conventional manufacture of optical modulation devices, a device using an acousto-optic effect is referred to as an ultrasonic wave optical modulator. This optical modulator generally uses an ultrasonic wave medium having a uniform optical refractive index, and is operated in such a way as to propagate ultrasonic waves having a uniform period of condensation and rarefaction through the ultrasonic wave medium in a specific direction, introduce laser light into the ultrasonic wave medium at an appropriate incident angle with respect to the direction of propagation of the ultrasonic waves, so that the introduced laser light is reflected by the surface of the ultrasonic waves within the medium and is modulated into diffracted light, and change the output of the ultrasonic waves, so that the state of the condensation and rarefaction of the ultrasonic waves propagating through the medium is changed, thereby changing the intensity of the diffracted light reflected by the surface of the ultrasonic waves and then modulating the laser light.

In the conventional optical modulator, in order to introduce laser light onto the surface of the ultrasonic waves in the medium at the specific incident angle θ, a light source must be installed at a specific inclined angle with respect to the side surface of the ultrasonic wave medium, therefore it is difficult to design and manufacture the system. Furthermore, since a light reflecting surface formed within the ultrasonic wave medium is formed through the aggregation of the ultrasonic waves, the light reflecting surface cannot act as a desirable reflecting surface. In particular, there is a problem in that the output of ultrasonic waves is reduced due to the dispersion of ultrasonic waves that occur within the ultrasonic wave medium. Moreover, there is a disadvantage in that a light absorbing element must be installed outside the ultrasonic wave medium to absorb non-modulated light. Furthermore, when the laser light is incident on the ultrasonic wave medium, the loss of light due to the reflection of light by the surface of the medium cannot be avoided. Moreover, when high-power laser light, such as Ar+laser light or Kr-laser light, is employed, heat generated within the ultrasonic wave medium influences the ultrasonic waves, therefore the modulation of light intensity becomes unstable.

Meanwhile, the conventional optical modulator has problems in that the width of a light beam is restricted in the direction of propagation of the ultrasonic waves and the switching rate is restricted due to time delay at the relatively low propagation speed of the ultrasonic waves.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Accordingly, the present invention has been made keeping in mind the above problems occurring in the prior art, and an object of the present invention is to provide a diffractive waveguide-spatial optical modulator that has high efficiency, high accuracy, high sensitivity, high resolution and a small size.

In order to accomplish the above object, the present invention provides a diffractive waveguide-spatial optical modulator, including a substrate member; a plurality of reflecting members each formed in a plate shape, arranged on the substrate member at regular intervals to form a grating array, configured to form openings therebetween, and provided with reflecting surfaces formed on the opposite vertical surfaces of the reflecting members and the bottoms of the openings; and an actuation means for varying the interval between the reflecting members by actuating the reflecting members; wherein the openings between the reflecting members act as wave guides when light is incident on the open sides thereof, and shift the phase of the incident light and then reflect the incident light, so that the reflected light can form diffracted light, when the interval is varied by the reflecting members.

DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
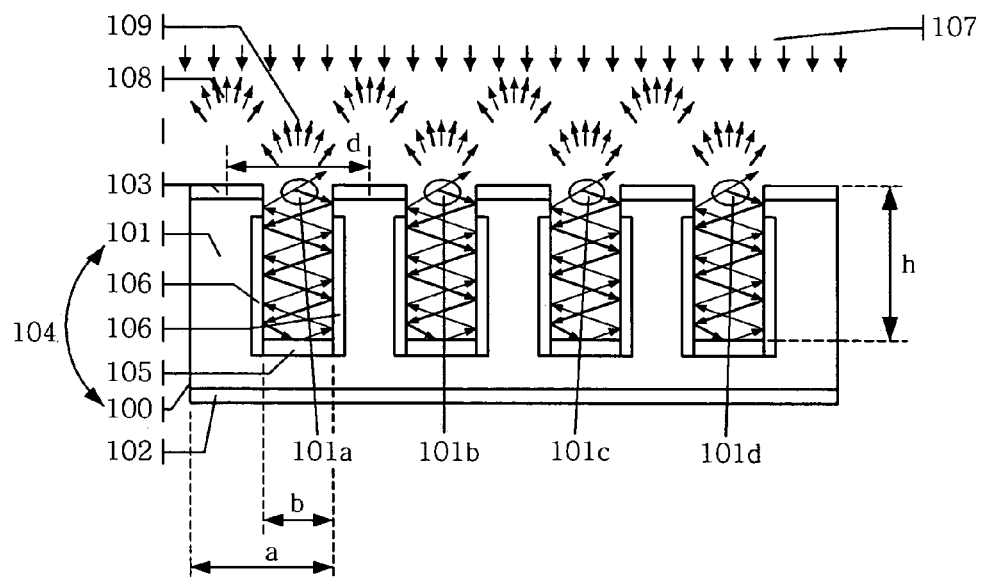
FIG. 1 is a sectional view of a diffractive waveguide-spatial optical modulator according to a preferred embodiment of the present invention.

While illustrative embodiments have been illustrated and described, it will be appreciated that various changes can be made therein without departing from the spirit and scope of the invention.

Reference now should be made to the drawings, in which the same reference numerals are used throughout the different drawings to designate the same or similar components.

With reference to FIGS. 1 to 6B, a diffractive waveguide-spatial optical modulator according to a preferred embodiment of the present invention will be described below.

FIG. 1 is a sectional view of the diffractive waveguide-spatial optical modulator according to the preferred embodiment of the present invention.

Referring to FIG. 1, the diffractive waveguide-spatial optical modulator according to the embodiment of the present invention includes a substrate member 100 that is made of piezoelectric material and is formed in the shape of a flat plate. Here, a common terminal layer 102 for applying piezoelectric voltage to the piezoelectric material is formed on one surface of the substrate member 100.

The waveguide-spatial optical modulator further includes a plurality of reflecting members 101 that are made of piezoelectric material, each project upward from the substrate member 100 in the shape of a rectangular plate, and together form a grating array. The reflecting members 101 are arranged at regular intervals, have vertical surfaces formed to face each other, and have side reflecting surfaces 106 formed on the opposite vertical surfaces.

A plurality of line terminal layers 103 for applying piezoelectric voltage to the piezoelectric material is formed on the tops of the reflecting member 101.

In this case, both upper and lower pieces of piezoelectric material and right and left pieces of piezoelectric material may be used as the piezoelectric material for the substrate member 100 and the reflecting member 101. Piezoelectric material, such as PzT, PNN-PT or ZnO, may be used as the piezoelectric material for the substrate member 100 and the reflecting member 101. Piezoelectric electrolytic material, including at least one of Pb, Zr, Zn and titanium, may be also used as the piezoelectric material for the substrate member 100 and the reflecting member 101.

Meanwhile, Pt, Ta/Pt, Ni, Au, Al, or $RuO_2$ may be used as the electrode material for the common terminal layer 102. Pt, Ta/Pt, Ni, Au, Al, or $RuO_2$ may be used as the electrode material for the line terminal layers 103. The side surfaces of the line terminal layers 103 may be used as reflecting surfaces for reflecting light.

The common terminal layer 102 forms one terminal for applied voltage that is provided to movable members 104 including the substrate member 100 and the reflecting member 101. The line terminal layers 103 form the other terminal. The line terminal layers 103 may be separated from each other and may be separately supplied with power from the outside. Alternatively, two or more of the line terminal layers 103 may be connected to each other and common voltage may be applied to the connected line terminal layers 103 from the outside.

Figure 2:
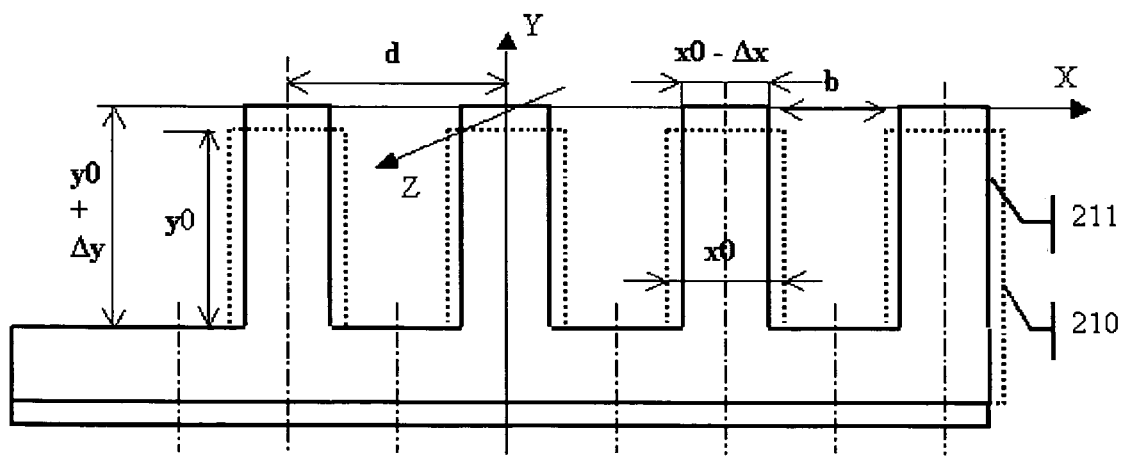
FIG. 2 is a view showing variations in width and depth when the diffractive waveguide-spatial optical modulator of FIG. 1 is operated.

Meanwhile, as the reflecting members 101 form a grating array, four openings 101a~101d are vertically formed parallel to each other, as illustrated in FIG. 2. Each of the openings 101a~101d has a rectangular depression shape, and is open at one side thereof. The openings 101a~101d have the same depth and the same width. When the width of the openings 101a~101d is "b", it is preferable that the width vary within a range that satisfies the inequality condition of the following Equation 3.

$$m\lambda/2 < b < (m+1)\lambda/2 \quad (3)$$

where $\lambda$ is the wavelength and m is the operating waveguide mode number. As an example, when the operating waveguide mode number is 1, the width b satisfies $\lambda/2 < b < \lambda$.

Reflecting surfaces 105 are formed on the bottoms of the openings 101a~101d, and the sidewall reflecting surfaces 106 are formed on the sidewalls thereof.

Light reflecting material 105, such as Ti, Cr, Cu, Ni, Al, Au, Ag, Pt or Au/Cr, is used as the material of the bottom reflecting surfaces 105 and the sidewall reflecting surfaces 106.

Furthermore, the line terminal layers 103 are separated from each other by the openings 101a~101d, and form a plurality of line shapes. That is, the line terminal layers 103 are separated for respective reflecting members 101, and the separated line terminal layers 103 form respective electrodes. The width a of the line terminal layers 103 is approximately the same as the width of the openings 101a~101d and the period d of such a structure is d=a+b, with the result that $\lambda < d < 2\lambda$, approximately.

Now, with reference to FIG. 1 and FIG. 2, the operation of the diffractive waveguide-spatial optical modulator according to the present embodiment will be described in detail below.

In FIG. 1, incident light 107 directed toward the reflecting members 101 is TE polarized light (vector E is parallel to the Z axis), and is incident on the line terminal layers 103 and the open sides of the openings 101a~101d.

Some of the incident light 107 incident on the line terminal layers 103 of the reflecting members 101 and the open sides of the openings 101a~101d is reflected by the line terminal layers 103, and forms reflected light 108.

Figure 3:
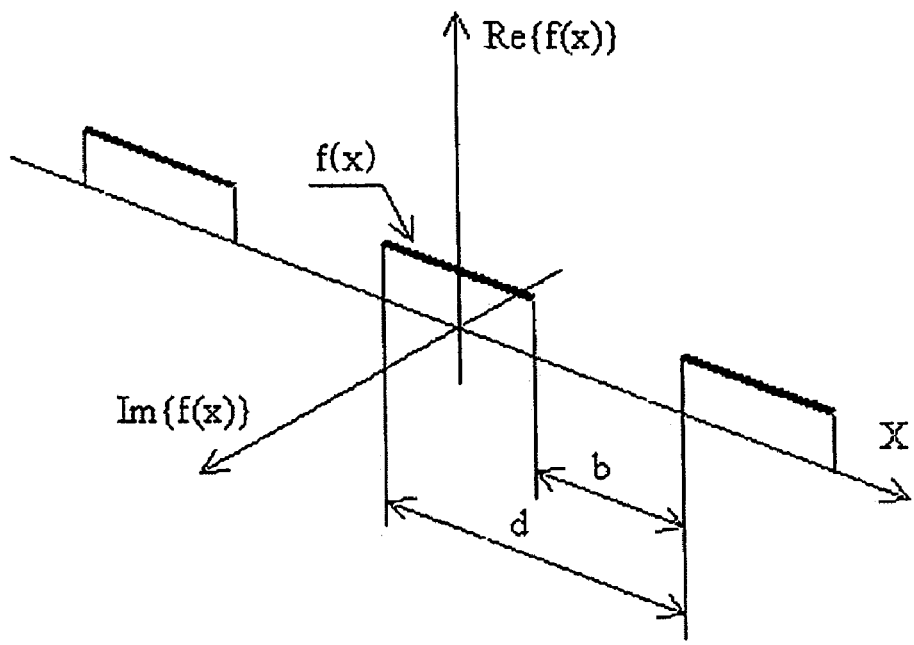
FIG. 3 is a view showing the light intensity of reflected light reflected from the line terminal layers of FIG. 1.

The reflected light 108 of the incident light 107 reflected from the line terminal layers 103 has half of the total power, and experiences a uniform phase shift of about 0, as illustrated in FIG. 3. In FIG. 3, f(x) represents the complex amplitude shift. The X axis represents the distance, the Z axis represents the real part of the light complex amplitude of the reflected light 108, and the Y axis represents the imaginary part of the light complex amplitude of the reflected light 108.

In this case, from FIG. 3, it can be seen that complex amplitude f(x) is real and phase shift is zero.

Meanwhile, the incident light 107 incident on the open sides of the openings 101a~101d between the reflecting members 101 is reflected from the bottom reflecting surfaces 105 and the sidewall reflecting surfaces 106 around the openings 101a~101d and is emitted through the entrances of the openings 101a~101d. At this time, the openings 101a~101d defined by the bottom reflecting surfaces 105 and the sidewall reflecting surfaces 106 act as wave guides. Each beam of incident light 107 is reflected by the sidewall reflecting surfaces 106 many times, directed toward the bottom reflecting surface 105, reflected by the bottom reflecting surface 105 and an adjacent sidewall reflecting surface 106, reflected by the sidewall reflecting surfaces 106 many times, and emitted through an opening 101a, 101b, 101c or 101d.

The phase shift $\phi$ of the reflected light 109 reflected by the openings 101a~101d is dependent on the depth h (or y0) of the openings 101a~101d and on the phase speed of a wave guide that is dependent on the width b of the openings 101a~101d when the reflected light 109 makes two round trips across each wave guide that is defined by a bottom reflecting surface 105 and two sidewall reflecting surfaces 106.

Figure 4:
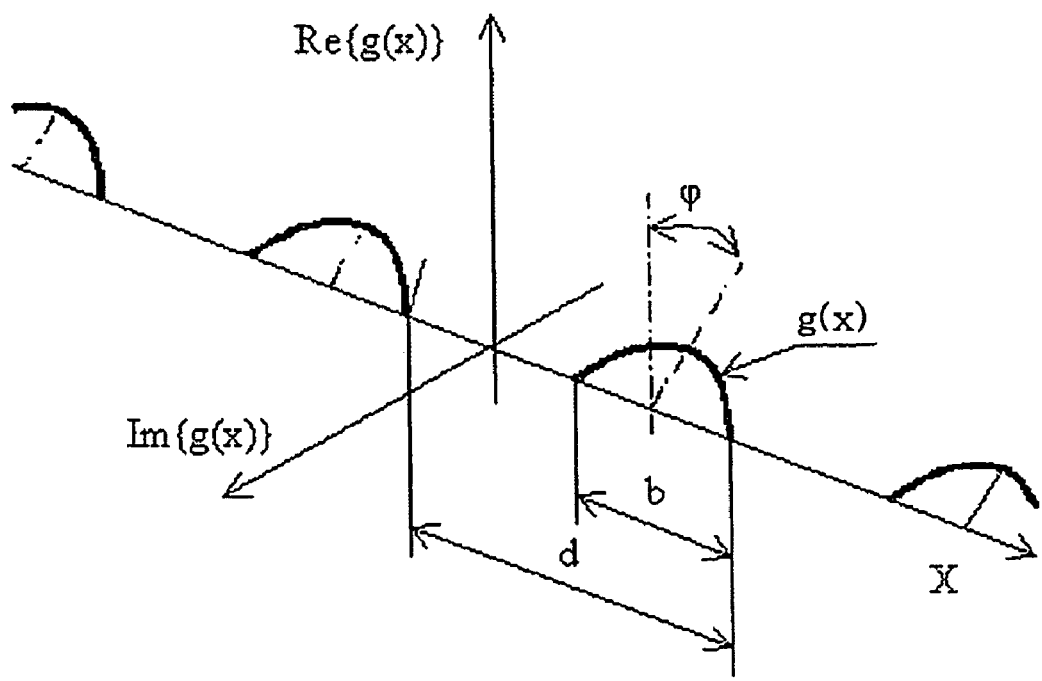
FIG. 4 is a view showing the light intensity of reflected light reflected from the openings of FIG. 1.

This phase shift φ as illustrated in FIG. 4 is the angle of complex amplitude g(x) rotation in complex plane Re{g(x)} and Im{g(x)}, where g(x) is complex amplitude distribution along X coordinate of the reflected light 109 reflected by the openings 101a~101d.

The dependency is expressed by the following Equation 4:

$$\varphi = \frac{4\pi}{\lambda} h \sqrt{1 - \left(\frac{\lambda}{2b}\right)^2} \quad (4)$$

Figure 6A:
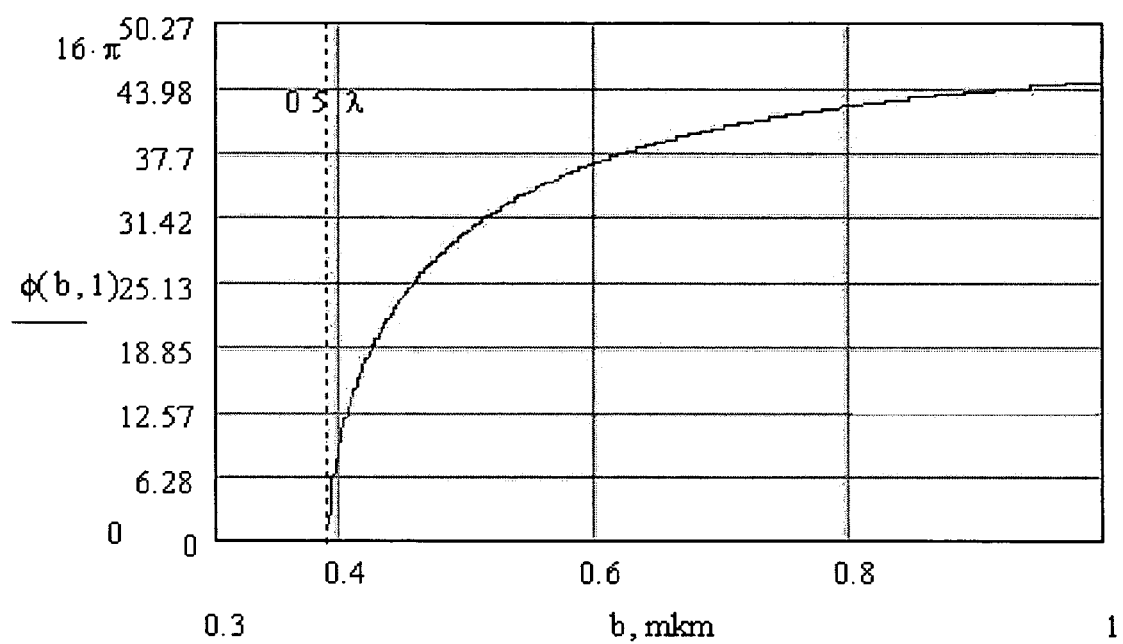
FIG. 6A is a graph illustrating phase shifts based on the variations in the width of the openings of FIG. 1.

The dependent relationship is illustrated in FIG. 6A. As illustrated in FIG. 6A, as width b approaches the threshold value λ/2 thereof, the phase shift varies by πradian when the width b of the openings 101a~101d varies a little.

Figure 5:
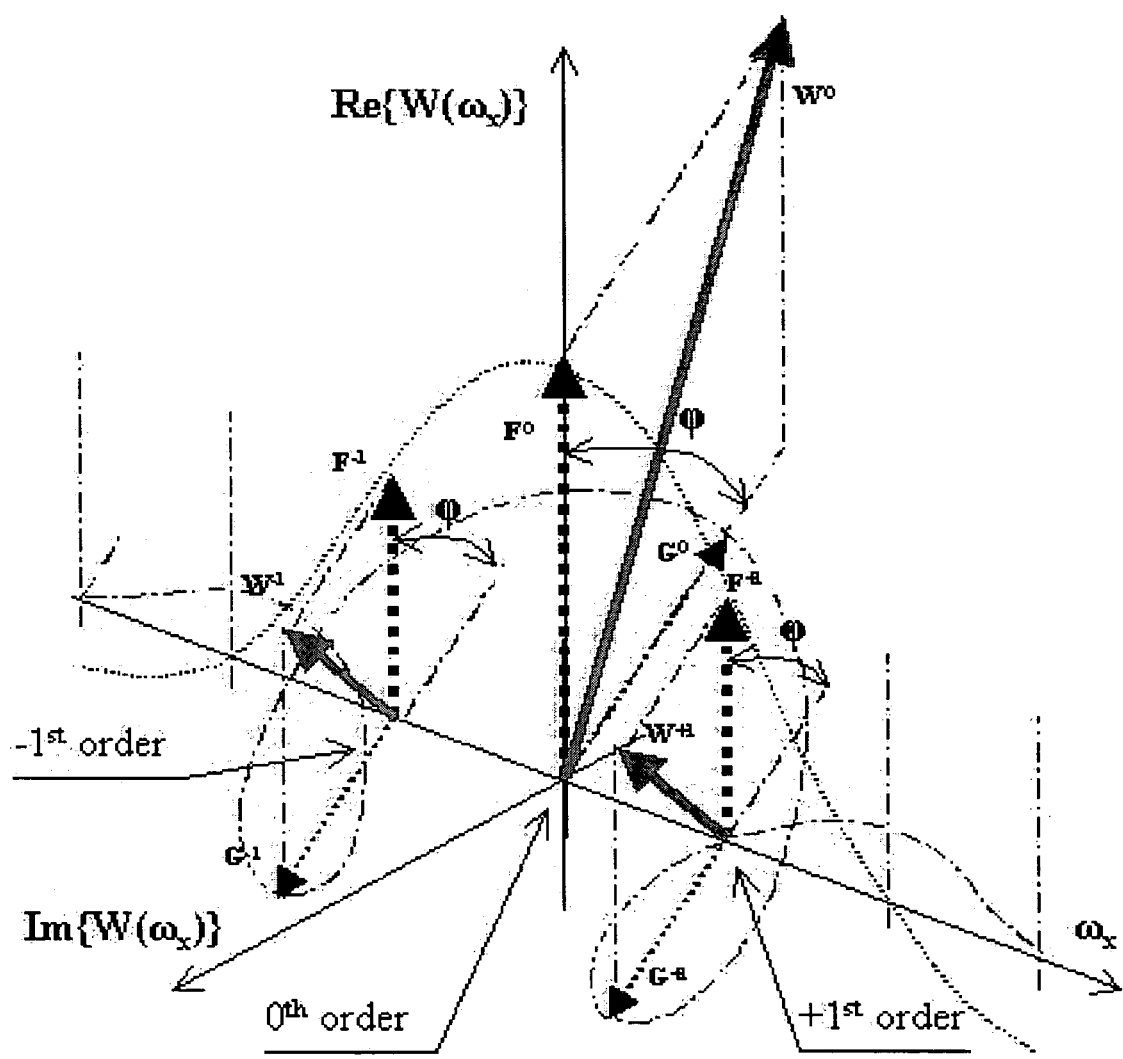
FIG. 5 is a view illustrating diffracted light that is formed by reflected light reflected by the line terminal layers of FIG. 1 and reflected light reflected from the openings of FIG. 1.

The reflected light 108 generated by the line terminal layers 103 and the reflected light 109 generated by the openings 101a~101d interfere with each other, and then form diffraction patterns at remote locations, as illustrated in FIG. 5.

That is, diffraction patterns F0, G0, F+1, G+1, F−1 and G−1 are formed according to diffraction orders, as illustrated in FIG. 5. The following Equation 5 shows the dependent relationship of efficiency for 0th and 1 st orders.

$$E_0 = \frac{P_0}{P} = \frac{1}{2}\left[1 + \cos\left[4\pi\frac{h}{\lambda}\sqrt{1-\left(\frac{\lambda}{2b}\right)^2}\right]\right] \quad (5)$$

$$E_1 = \frac{P_1}{P} = 0.2\left[1 - \cos\left[4\pi\frac{h}{\lambda}\sqrt{1-\left(\frac{\lambda}{2b}\right)^2}\right]\right]$$

Figure 6B:
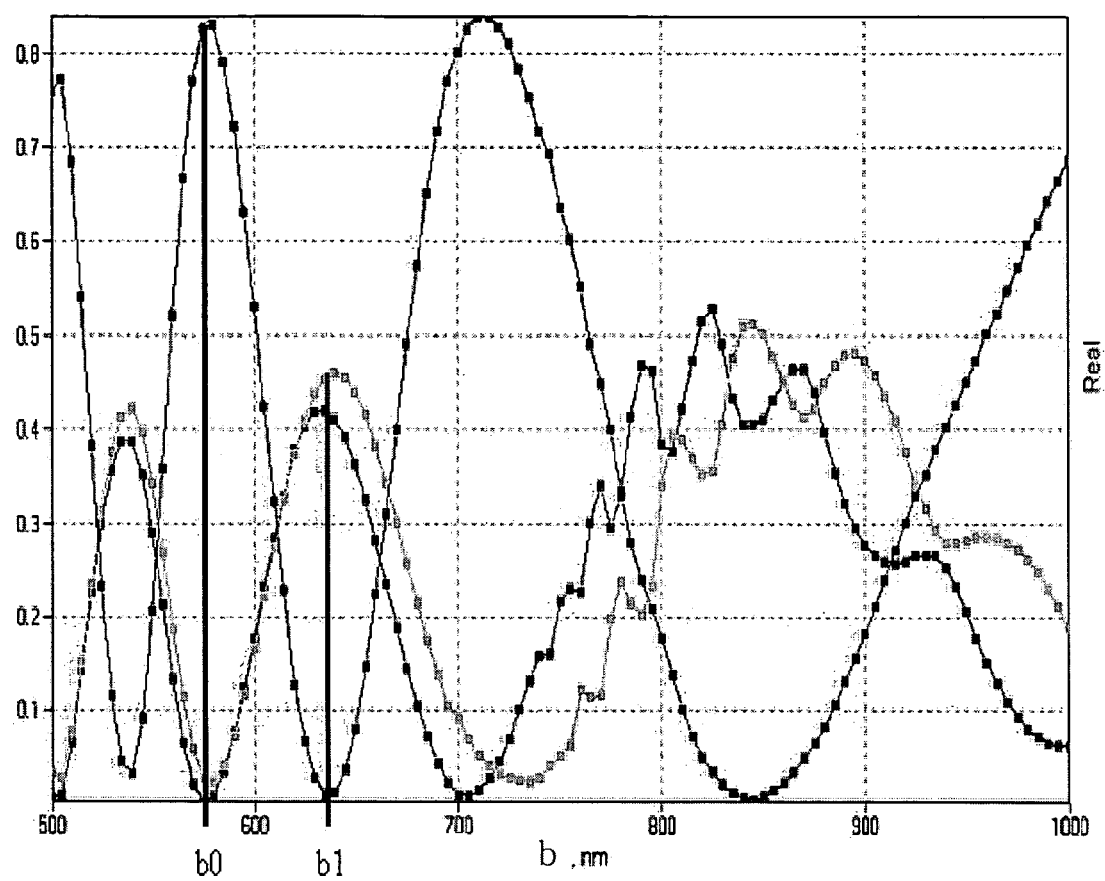
FIG. 6B is a graph illustrating the diffraction order-based light intensity of diffracted light that is formed by reflected light reflected from the line terminal layers of FIG. 1 and reflected light reflected from the opening of FIG. 1.

FIG. 6B is a graph illustrating the dependent relationship of efficiency for different diffraction orders according to the width b of the openings 101a~101d. Initial values h0 and b0 (when voltage is zero) are selected to have integer multiples of a phase cycle φ0=2πn where n=1, 2, 3, . . . .

In this case, the principal part of light intensity is concentrated on 0th-order diffracted light (at FIG. 6B at b=b0).

Meanwhile, when voltage is applied to the common terminal layer 102 and the line terminal layers 103, the reflecting members 103 are laterally contracted or expanded, thereby varying the depth h and the width b.

In FIG. 2, dotted lines illustrate the state in which drive voltage is not applied to the line terminal layers 103, while solid lines illustrate the state in which drive voltage is applied to the line terminal layers 103. When drive voltage is applied to the line terminal layers 103, the width b increases and the phase speed within the wave guide decreases. Accordingly, as illustrated in FIG. 6A, the phase shift φ of the emitted light 109 emitted from the openings 101a~101d increases. Meanwhile, as illustrated in FIG. 6B, when the width b is b1, the phase shift reaches φ=φ0+π, and the principle power of the emitted light is concentrated on light having the +1st diffraction order and light having the −1st diffraction order, and the power of diffracted light having the 0th diffraction order is lowest.

When the width b of the wave guide approaches a threshold value as illustrated in FIG. 6A, the phase shift depending on the variation in the width of the openings 101a~101d rapidly increases. When a very small variation occurs, for example, Δx=b1−b0, the phase shift is φ−φ0=π, that is, π.

For this reason, the total efficiency is 5 or 10% per unit voltage. As illustrated in FIG. 6A, when the wavelength of light is 800 nm, the pitch of the line terminal layers 103 ranges from 0.8 to 1.6 mkm.

In this case, the size of each pixel is several mkm. As a result, high density and high resolution can be provided.

Figure 7:
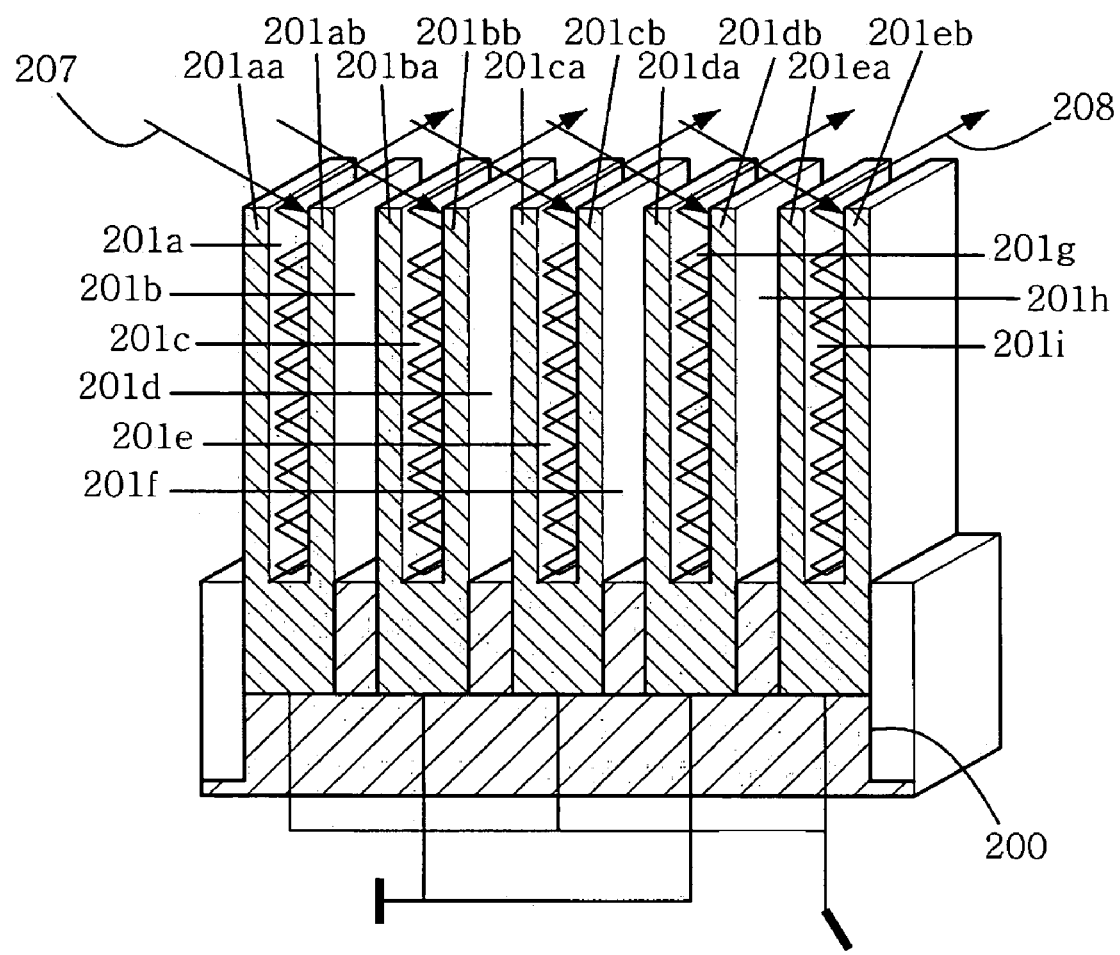
FIG. 7 is a sectional view of a diffractive waveguide-spatial optical modulator according to another embodiment of the present invention.

FIG. 7 is a sectional view of a diffractive waveguide-spatial optical modulator according to another embodiment of the present invention.

Referring to FIG. 7, the diffractive waveguide-spatial optical modulator according to another embodiment of the present invention includes a substrate member 200 that is formed in the shape of a flat plate. Here, the substrate member 200 is made of insulating material, therefore a circuit pattern may be formed inside or outside the substrate member 200.

The waveguide-spatial optical modulator further includes a plurality of reflecting members 201aa~201eb that each project upward from the substrate member 200 in the shape of a rectangular plate and together form a grating array.

The reflecting members 201aa~201eb are arranged at regular intervals, and have vertical surfaces formed to face each other and have reflecting surfaces formed on the vertical surfaces. Here, reflecting surfaces may be formed on all of the opposite vertical surfaces of the reflecting members 201aa~201eb. Alternatively, the reflecting members 201aa~201eb may be paired into a plurality of pairs of reflecting members 201aa and 201ab, 201ba and 201bb, 201ca and 201cb, 201da and 201db, and 201ea and 201eb, and then reflecting surfaces may be respectively formed on two paired opposite vertical surfaces of each pair of reflecting members 201aa and 201ab, 201ba and 201bb, 201ca and 201cb, 201da and 201db, or 201ea and 201eb. That is, reflecting surfaces are not formed on the non-paired opposite vertical surfaces.

By doing so, reflected light is formed by reflecting light using only the reflecting surfaces of the two paired opposite vertical surfaces of each pair of reflecting members 201aa and 201ab, 201ba and 201bb, 201ca and 201cb, 201da and 201db, or 201ea and 201eb, but reflected light is not formed between the reflecting surfaces that respectively belong to different pairs of reflecting member. No variation in the light intensity of reflected light is caused by the variation in the interval between the reflecting surfaces that respectively belong to different pairs of reflecting members. Accordingly, since reflecting surfaces are formed on some of the side vertical surfaces of the reflecting members 201aa~201eb, the intensity of diffracted light can be easily controlled by controlling phase shifts.

A plurality of top reflecting surfaces is formed on the tops of the reflecting members 201aa~201eb, and reflects incident light.

Conductive material is preferably used as the material of the reflecting members 201aa~201eb, more preferably, Pt, Ta/Pt, Ni, Au, Al, or $RuO_2$.

The pairs of reflecting members 201aa and 201ab, 201ba and 201bb, 201ca and 201cb, 201da and 201db, and 201ea and 201eb are connected to the power source, as illustrated in FIG. 7. As described above, each pair of reflecting members 201aa and 201ab, 201ba and 201bb, 201ca and 200cb, 201da and 201db, or 201ea and 201eb is connected to in such manner that voltage of different polarity is applied to the neighbor pairs of reflecting members 201aa~201eb. Thus pairs: 201aa and 201ab, 201ca and 201cb, 201ea and 201eb are connected to signal wire, while pairs: 201ba and 201bb, 201da and 201db are connected to common electrode, therefore attractive force is generated between neighbor pairs, and thus the interval therebetween increases. For example, a pair of reflecting members 201ba and 201bb is taken as an example. Since the reflecting members 201ba and 201bb are connected to the common terminal, they have different electric polarity relative to neighbor pairs: 201aa and 201ab, 201ca and 201cb connected to signal wire, when a power source is applied. Therefore attractive force is generated between reflecting members 201ab-201ba and 201bb-201ca, and thus the interval between the opposite vertical surfaces 201ba and 201bb thereof increases. As a result, the optical path of incident light 207 that is reflected by the reflecting members 201ba and 201bb and moves increases, therefore a phase shift thereof is generated.

When the pairs of reflecting members 201aa and 201ab, 201ba and 201bb, 201ca and 200cb, 201da and 201db, and 201ea and 201eb are connected to respective common terminals, they can be separately controlled, so the accuracy and ease of control increase. Of course, as illustrated in FIG. 7, the pairs of reflecting members 201aa and 201ab, 201ba and 201bb, 201ca and 200cb, 201da and 201db, and 201ea and 201eb may be connected to the same terminal and controlled.

Meanwhile, as the reflecting members 201aa~201eb form a grating array, nine openings 201a~201i are vertically formed parallel to each other, as illustrated in FIG. 7. Each of the openings 201a~201i has a rectangular depression shape, and is open at one side thereof. The openings 201a~201i have the same depth and the same width. When the width of the openings 201a~201i is "b", it is preferable that the variable range of the width satisfy the inequality condition of the following Equation 6.

$$m\lambda/2 < b < (m+1)\lambda/2 \quad (6)$$

where $\lambda$ is the wavelength and m is the operating waveguide mode number. As an example, when the operating waveguide mode number is 1, the width b satisfies $\lambda/2 < b < \lambda$.

Bottom reflecting surfaces are formed on the bottoms of the openings 201a~201i (it is preferable that a bottom reflecting surface be formed only on the bottom of the opening 201a, 201c, 201e, 201g or 201i of each pair of reflecting members 201aa and 201ab, 201ba and 201bb, 201ca and 201cb, 201da and 201db, or 201ea and 201eb), and sidewall reflecting surfaces are formed on the sidewalls thereof (it is preferable that sidewall reflecting surfaces be formed only on the opposite vertical surfaces of each pair of reflecting members 201aa and 201ab, 201ba and 201bb, 201ca and 201cb, 201da and 201db, or 201ea and 201eb).

Now, with reference to FIG. 7, the operation of the diffractive waveguide-spatial optical modulator according to the present embodiment will be described in detail below.

In FIG. 7, incident light 207 directed toward the reflecting members 201aa~201eb is TE polarized light (vector E is parallel to the Z axis), and is incident on the reflecting members 201aa~201eb and the open sides of the openings 201a~201i.

Part of the incident light 207 incident on the reflecting members 201aa~201eb and the open sides of the openings 201a~201i is reflected by the top reflecting surfaces of the reflecting members 201aa~201eb, and forms reflected light 208.

Furthermore, the incident light 207 incident into the openings 201a~201i defined by the reflecting members 201aa~201eb is reflected by the side reflecting surfaces, and forms reflected light 208. The phase shift of the reflected light varies with the interval between two reflecting members of each reflecting member pair. Accordingly, when the interval between the reflecting members varies, the phase of reflected light varies, therefore the reflected light overlaps the light reflected by an adjacent reflecting member pair, thereby forming diffracted light.

Figure 8:
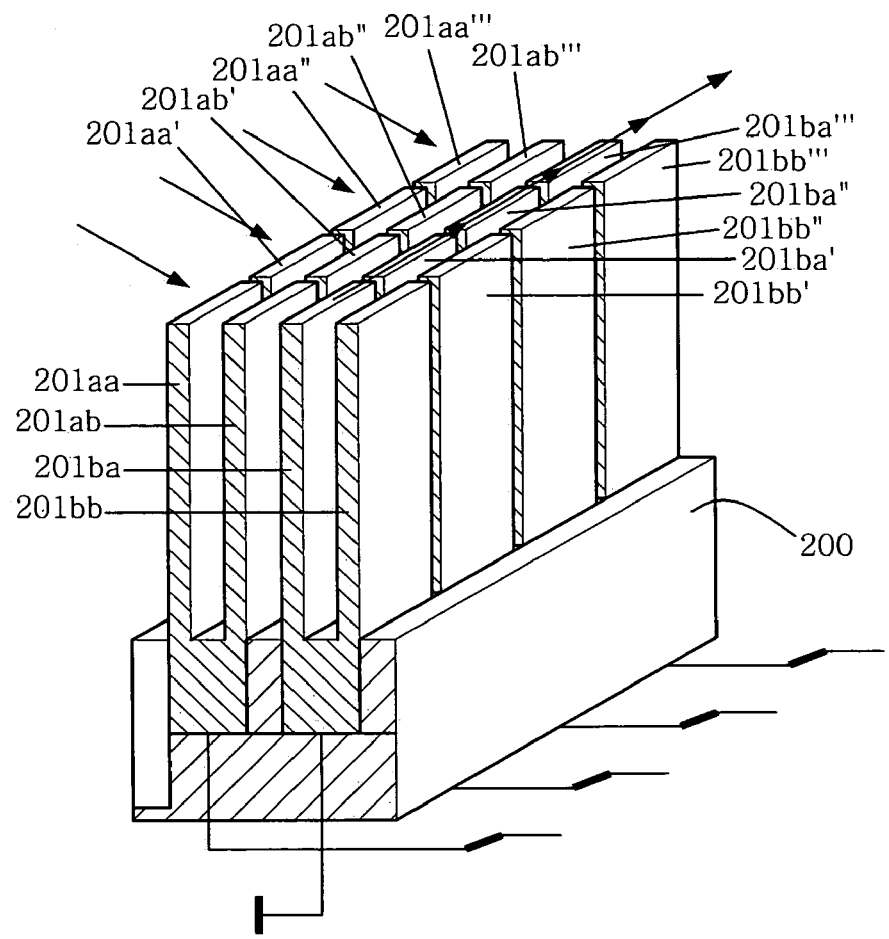
FIG. 8 is a sectional view of a diffractive waveguide-spatial optical modulator according to still another embodiment of the present invention.

FIG. 8 is a sectional view of a diffractive waveguide-spatial optical modulator according to still another embodiment of the present invention.

Referring to FIG. 8, it can be seen that the diffractive waveguide-spatial optical modulator according to the present embodiment forms a two-dimensional grating array, unlike that of FIG. 7.

As illustrated in FIG. 8, in the diffractive waveguide-spatial optical modulator of FIG. 8, a one-dimensional grating array has been laterally expanded and formed into a two-dimensional array, thereby line-shaped diffracted light can be obtained.

Such a diffractive waveguide-spatial optical modulator having the above-described construction forms a line image in a display application, and the line image can form a two-dimensional image by scanning.

In FIG. 8, reflecting members 201aa~201bb form diffracted light corresponding to a pixel, reflecting members 201aa'~201bb' form diffracted light corresponding to another pixel, reflecting members 201aa"~201bb" form diffracted light corresponding to still another pixel, and reflecting members 201aa'"~201bb'" form diffracted light corresponding to yet another pixel, consequently diffracted light corresponding to four pixels can be generated. By scanning the diffracted light corresponding to four pixels, a two-dimensional image can be generated.

Figure 9:
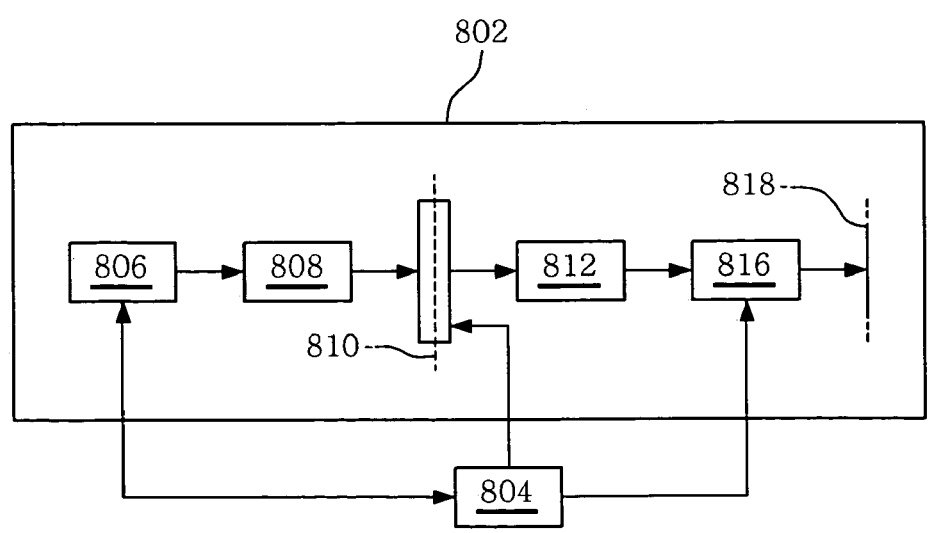
FIG. 9 is a diagram showing the construction of a display device using the diffractive waveguide-spatial optical modulator according to an embodiment of the present invention.

FIG. 9 is a diagram showing the construction of a display device using the diffractive waveguide-spatial optical modulator according to an embodiment of the present invention. The optical system used in a display device may also be used in a printer, etc., in which case a drum is employed instead of a screen 818, which will be described later. In the case where the drum is employed as described above, the drum rotates, so the printer does not necessarily require a separate scanning optical unit, unlike the display device.

Referring to FIG. 9, the display device using the diffractive waveguide-spatial optical modulator according to the present embodiment includes a display optical system 802 and a display electronic system 804. The display optical system 802 includes a light source 806, an illumination optical unit 808 for generating linear light to radiate light, radiated from the light source 806, onto a diffractive waveguide-spatial optical modulator 810 in a linear light form, the diffractive waveguide-spatial optical modulator 810 for modulating the linear light, radiated from the illumination optical unit 808, into diffracted light, a filtering optical unit 812 for separating the diffracted light, obtained through the diffractive waveguide-spatial optical modulator 810, according to diffraction order and passing only diffracted light having desired diffraction orders, selected from the diffracted light having a plurality of diffraction orders, therethrough, a projection and scanning optical unit 816 for condensing the diffracted light passed through the filtering optical unit 812, and scanning linear light, obtained through the condensing, in a two-dimensional image form, and a display screen 818.

The display electronic system 804 is electrically connected to the light source 806, the diffractive waveguide-spatial optical modulator 810, and the projection and scanning optical unit 816.

When linear light enters from the illumination optical unit 808, the diffractive waveguide-spatial optical modulator 810 modulates the incident light into diffracted light and then emits the diffracted light under the control of the display electronic system 804.

Meanwhile, when diffracted light having a plurality of diffraction orders enters, the filtering optical unit 812 separates diffracted light having desired diffraction orders from the entering diffracted light. The filtering optical unit 812 includes a Fourier lens (not shown) and a filter (not shown), and passes 0th-order diffracted light or ±1st-order diffracted light, selected from incident diffracted light, therethrough.

The projection and scanning optical unit 816 includes a condensing lens (not shown) and a scanning mirror (not shown), and scans incident diffracted light across the screen 818 under the control of the display electronic system 804.

The display electronic system 804 operates the scanning mirror (not shown) of the projection and scanning optical unit 816. The projection and scanning optical unit 816 projects an image onto the display screen 818 and then scans the image across the display screen 818 to form a two-dimensional image on the display screen 818.

Meanwhile, although the case where the diffractive waveguide-spatial optical modulator is used in a display device has been described above, the diffractive waveguide-spatial optical modulator may be used in a printing device, and may also be used in a temperature sensor, a tension sensor, etc.

According to the above-described present invention, high efficiency, high reliability and high sensitivity can be achieved.

Furthermore, according to the present invention, there is an advantage in that high resolution can be realized using a small-sized apparatus.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The embodiments of the invention in which an exclusive property or privilege is claimed are defined as follows:

1. A diffractive waveguide-spatial optical modulator, comprising:
    a substrate member;
    a plurality of reflecting members each formed in a generally planar shape, arranged on the substrate member at regular intervals to form a grating array, configured to form openings therebetween, and provided with reflecting surfaces formed on opposite upright surfaces of the reflecting members and bottoms of the openings; and
    actuation means for varying an interval between the reflecting members by actuating the reflecting members;
    wherein the openings between the reflecting members act as wave guides when light is incident on open sides thereof, and shift a phase of the incident light and then reflect the incident light, so that the reflected light can form diffracted light, when the interval is varied by the reflecting members.

2. The diffractive waveguide-spatial optical modulator as set forth in claim 1, wherein:
    the reflecting members are provided with reflecting surfaces on the exterior thereof, and reflect the incident light; and
    the actuation means varies the phase of the reflected light by varying locations of the reflecting surfaces of the reflecting members.

3. The diffractive waveguide-spatial optical modulator as set forth in claim 2, wherein the interval of the openings is similar to a width of the upper reflecting surfaces of the reflecting members.

4. The diffractive waveguide-spatial optical modulator as set forth in claim 2, wherein a width of the openings is similar to a depth of the openings.

5. The diffractive waveguide-spatial optical modulator as set forth in claim 1, wherein:
    the reflecting members are made of piezoelectric material; and
    the actuation means comprises a common terminal layer formed on one surface of the substrate member, a plurality of line terminal layers formed on the reflecting members, and is configured to apply voltage to the common terminal layer and the line terminal layers, so that the interval between the reflecting members can be varied through expansion and contraction of the piezoelectric material of the reflecting members.

6. The diffractive waveguide-spatial optical modulator as set forth in claim 5, wherein the piezoelectric material contains at least one selected from the group consisting of PzT, PNN-PT, ZnO, Pb, Zr, Zn, and titanium.

7. The diffractive waveguide-spatial optical modulator as set forth in claim 5, wherein the common terminal layer and the line terminal layers are made of electrode material selected from the group consisting of Pt, Ta/Pt, Ni, Au, Al and $RuO_2$.

8. The diffractive waveguide-spatial optical modulator as set forth in claim 1, wherein:
    the reflecting members are formed of conductive material; and
    the actuation means applies current having an identical electrical polarity to adjacent reflecting members, so that the interval therebetween can be varied.

9. The diffractive waveguide-spatial optical modulator as set forth in claim 8, wherein the reflecting members are arranged with adjacent reflecting members into pairs of reflecting members, reflecting surfaces are formed on opposite upright surfaces of each reflecting member pair, and no reflecting surface is formed on remaining upright surfaces of the reflecting member pair.

10. The diffractive waveguide-spatial optical modulator as set forth in claim 8, wherein the conductive material of the reflecting members is one selected from the group consisting of Pt, Ta/Pt, Ni, Au, Al and $RuO_2$.

11. The diffractive waveguide-spatial optical modulator as set forth in claim 1, wherein the reflecting members form a two-dimensional grating array.

12. A display device, comprising:
    a light source for emitting light;
    a diffractive waveguide-spatial optical modulator, comprising a substrate member; a plurality of reflecting members each formed in generally a planar shape, arranged on the substrate member at regular intervals to form a grating array, configured to form openings therebetween, and provided with reflecting surfaces formed on opposite upright surfaces of the reflecting members and bottoms of the openings, and actuation means for varying an interval between the reflecting members by actuating the reflecting members, wherein the openings between the reflecting members act as wave guides when light is incident on open sides thereof, and shift a phase of the incident light and then reflect the incident light, so that the reflected light can form diffracted light, when the interval is varied by the reflecting members;
    an illumination optical unit for radiating light, radiated from the light source, onto the diffractive waveguide-spatial optical modulator;
    a filtering optical unit for selecting diffracted light having one or more desired diffraction orders from the diffracted light obtained through the modulation by the diffractive waveguide-spatial optical modulator, and passing the diffracted light having one or more desired diffraction orders therethrough; and a projection and scanning optical unit for scanning the diffracted light, passed through the filtering optical unit, across an object while projecting it onto the object.

13. The display device in claim 12, wherein in the diffractive waveguide-spatial optical modulator:

the reflecting members are provided with reflecting surfaces on the exterior thereof, and reflect the incident light; and the actuation means varies the phase of the reflected light by varying locations of the reflecting surfaces of the reflecting members.

14. The display device in claim 13, wherein in the diffractive waveguide-spatial optical modulator the interval of the openings is similar to a width of the upper reflecting surfaces of the reflecting members.

15. The display device in claim 13, wherein in the diffractive waveguide-spatial optical modulator a width of the openings is similar to a depth of the openings.

16. The display device in claim 12, wherein in the diffractive waveguide-spatial optical modulator:

the reflecting members are made of piezoelectric material; and the actuation means comprises a common terminal layer formed on one surface of the substrate member, a plurality of line terminal layers formed on the reflecting members, and is configured to apply voltage to the common terminal layer and the line terminal layers, so that the interval between the reflecting members can be varied through expansion and contraction of the piezoelectric material of the reflecting members.

17. The display device of claim 12, wherein in the diffractive waveguide-spatial optical modulator:

the reflecting members are formed of conductive material; and the actuation means applies current having an identical electrical polarity to adjacent reflecting members, so that the interval therebetween can be varied.

18. The display device of claim 17, wherein in the diffractive waveguide-spatial optical modulator the reflecting members are arranged with adjacent reflecting members into pairs of reflecting members, reflecting surfaces are formed on opposite upright surfaces of each reflecting member pair, and no reflecting surface is formed on remaining upright surfaces of the reflecting member pair.

19. The display device of claim 12, wherein in the diffractive waveguide-spatial optical modulator the reflecting members form a two-dimensional grating array.

* * * * *